Figure 1:
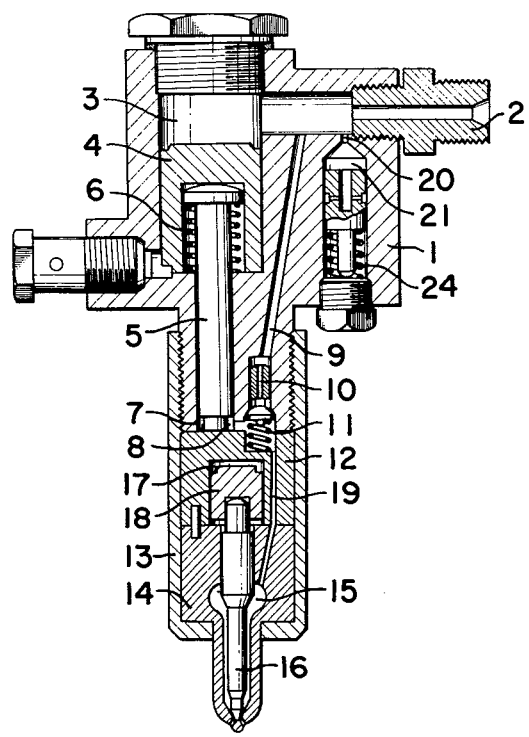

United States Patent [19]

Aoki et al.

[11] 3,955,547

[45] May 11, 1976

[54] FUEL INJECTION DEVICE FOR INTERNAL COMBUSTION ENGINES

[75] Inventors: Hachiro Aoki; Motonobu Sunaga, both of Higashimatsuyama, Japan

[73] Assignee: Diesel Kiki Kabushiki Kaisha, Tokyo, Japan

[22] Filed: Oct. 30, 1974

[21] Appl. No.: 519,238

[52] U.S. Cl. ................. 123/139 BC; 123/139 R
[51] Int. Cl.² ................. F02M 39/00; F02D 1/04
[58] Field of Search ...... 123/139 BC, 139 R, 32 AC

[56] References Cited
UNITED STATES PATENTS

| | | | |
|---|---|---|---|
| 2,598,528 | 5/1952 | French | 123/32 AC |
| 2,777,433 | 1/1957 | MacCracken | 123/139 BC |
| 2,839,040 | 6/1958 | High | 123/139 BC |

*Primary Examiner*—Charles J. Myhre
*Assistant Examiner*—Ronald B. Cox
*Attorney, Agent, or Firm*—Henry R. Lerner

[57] ABSTRACT

A fuel injection device for internal combustion engines, comprising: a source of pressurized fuel supply, a fuel distributor-controller by means of a rotor rotating in a stationary sleeve and fuel injection valves each being integrally composed of a large-diameter servo piston, a small-diameter plunger and a nozzle the fuel injection quantity control mechanism and injection-timing control mechanism utilizing the variable pressure produced by throttling, under control, the oil returning from the servo piston.

6 Claims, 10 Drawing Figures

FUEL INJECTION DEVICE FOR INTERNAL COMBUSTION ENGINES

In automotive vehicles, it is desired that the fuel injection timing be adjustable according to speeds and loads of an engine, but it has been difficult to realize such a mode of adjustment because two concurrent adjustments it involves can be implemented only by a device which is necessarily complex.

The present invention relates to a fuel injection device for internal combustion engines, comprising: a source of pressurized fuel supply, from which the fuel oil is continuously supplied at a constant supply pressure; a fuel distributor-controller in which between a rotor rotating at a speed related to engine speed and a stationary sleeve controls the constant-pressure fuel oil by the rotating of the rotor and distributes the fuel oil; and fuel injection valves which receives distributed fuel oil, each being integrally composed of a large-diameter servo piston reciprocating due to the pressure of fuel oil being distributed by said distributor-controller and also to the force of an urging spring, and a nozzle in which this high-pressure fuel oil is injected by a small-diameter plunger following and moving with the large-diameter servo piston and thereby being capable of pressurizing the constant-pressure fuel oil further to a higher pressure value to produce a high-pressure fuel oil. The distinct feature of the device according to this invention is a hydraulic mechanism or, in particular, a fuel injection quantity control mechanism and an injection timing control mechanism, which utilize the variable pressure produced by throttling, under control, the oil returning from the servo piston. This invention purports to provide a novel fuel injection device for use in automotive direct injection engines, which device is capable of satisfying the conditions for high and complex engine performance and clean exhaust gas required of this type of the engine. Injection pumps conventionally used hitherto can be used with the device according to this invention.

Figure 2:
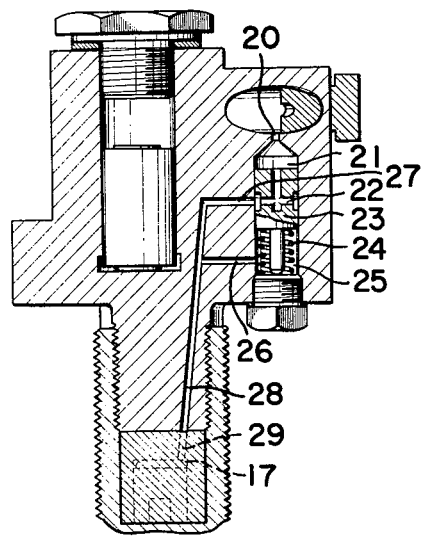
Figure 3:
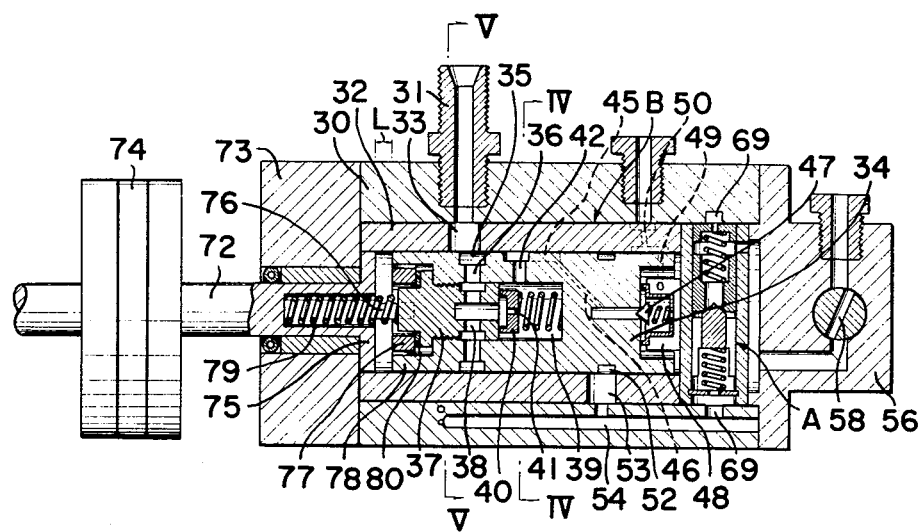
Figure 4:
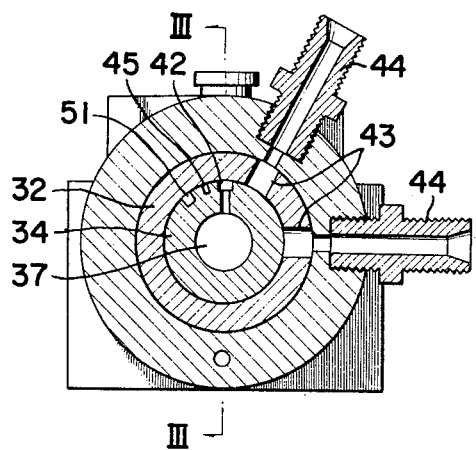
Figure 5:
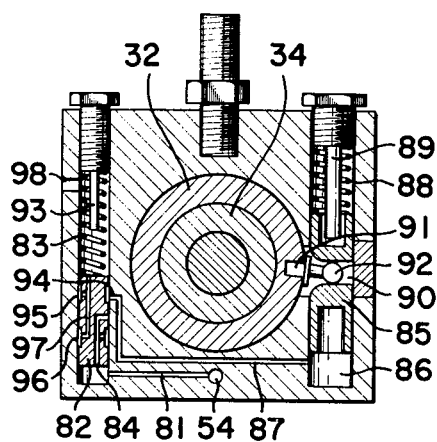
Figure 6:
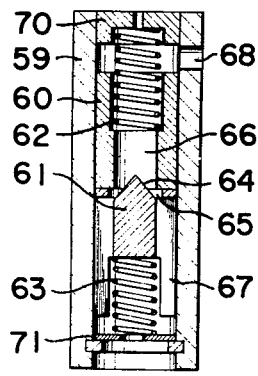
Figure 7:
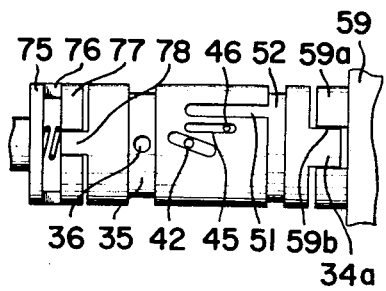

An embodiment of this invention will be described in detail by referring to the accompanying drawings, in which:

FIGS. 1 and 2 show longitudinal cross sections of a fuel injection valve of the fuel injection device according to this invention;

FIGS. 3 through 7, inclusive, illustrate a distributor-controller, FIG. 3 being a cross section taken along the line III—III of FIG. 4 and FIGS. 4 and 5 being cross sections taken along the lines IV—IV and V—V of FIG. 3, FIG. 6 is an enlarged view of a portion A of FIG. 3 and FIG. 7 is a view taken in the direction of arrow B of FIG. 3.

Referring to FIGS. 1 and 2, the fuel injection valve according to this invention comprises a servo piston chamber 3 communicated to the outside through a pipe connector 2 threadedly fitted into a body 1, a servo piston 4 contained in chamber 3 and capable of reciprocating therein, a plunger spring 6 seated on the bottom of the servo piston chamber 3 and supporting, by its top end, a plunger 5 to keep this plunger pushed elastically against the piston 4, a check valve 10 and its spring 11 provided in the juncture between an oil passage 8, opening into a pressurizing chamber 7 under the plunger 5, and oil passage 9, opening into the passage provided in the pipe connector 2, a nozzle 14 secured by a nozzle nut 13 to the body 1 with a spacer 12 being interposed between the body and the nozzle, an oil reservoir 15 formed within the nozzle 14, a needle valve 16, a piston 18 capable of sliding movement inside an oil chamber 17 provided in the spacer 12, an oil passage 19 intercommunicating the oil reservoir 15 to the check valve 10, an oil chamber 21 communicated, through a throttling port 20, to the passage within the connector 2, a piston valve 23 having a communicating hole 22 and capable of reciprocating within the oil chamber 21, the communicating hole 22 being interrupted by reciprocating movement of the valve 23, a valve chamber 25 located on the side opposite the oil chamber 21 and containing a valve spring 24, an oil passage 26 opening into the valve chamber 25 and an oil passage 27 meeting said communicating hole 22, and oil passages 28 and 29 by which passages 27 and 26 are communicated to the oil chamber 17.

How the fuel injection valve constructed as above operates will be explained. Fuel oil is supplied under pressure from the supply source, not shown, to the distributor-controller, of which detailed mention will be made later. This controller divides the fuel oil and delivers it to each injection valve through a line leading to pipe connector 2. The distributed fuel oil enters the servo piston chamber 3 at a pressure $Pp$. The force due to this pressure pushes the servo piston 4 and the plunger 5 down against the force of the plunger spring 6. By this downward stroke of the plunger 5, the fuel oil in the pressurizing chamber 7 becomes compressed to a higher pressure level. The pressure thus raised is transmitted by the oil passage 19 to the oil reservoir 15. The fuel oil at the supply pressure $Pp$, fed into the pipe connector 2, applies also to the oil chamber 21 through the throttling port 20. In the chamber 21, the pressure $Pp$ causes the piston valve 23 to be pushed downward against its spring 24. As the piston valve 23 moves down, its communicating hole 22 meets the opening or port of the oil passage 27 to supply the fuel oil to the oil chamber 17 through the passages 28 and 29. Pressure $Pol$ occurring in chamber 17 owes to this oil supply and causes the piston 18 to push needle valve 16 down into its closed position.

The pressure in the oil chamber 21, necessary for making the communicating hole 22 meet the opening of oil passage 27 and takes a constant value as determined by the valve spring 24. It follows therefore that the pressure $Pol$ within the oil chamber 17 is constant when chamber 21 is in communication with chamber 17. Hence, the valve opening pressure $Po$ of nozzle 14 takes a constant value.

The relationship among pressures $Po$, $Pol$ and $Pp$ may be written in the form of the following equation:

$$Po = \frac{Pol\,Ap}{An} - \frac{(Pp\,Av - k.d)Ap}{An\,Av}$$

where $An$, $Ap$ and $Av$ are the pressure areas of the needle valve 16, the piston 18 and the piston valve 23, respectively; $k$ is a spring constant of the valve spring 24; $d$ is a deflection amount of compression which, when the hole 22 becomes communicated to the passage 27, occurs to the valve spring 24. When the raised pressure, produced in pressurizing chamber 7 and transmitted to oil chamber 15, exceeds the pressure $Po$, the needle valve 16 will rise to allow the fuel oil to be sprayed out. When the pressure in the servo piston chamber 3 drops owing to the action of the distributor-controller, the plunger spring 6 forces the piston 4 and the plunger 5 upward, making the two move on return stroke. At this time, the check valve 10 opens to fill the fuel oil into the pressurizing chamber 7. The return stroke of the servo piston 4 is determined by the degree of pressure drop in the chamber 3, that is, by the position at which the plunger spring 6 balance with the back pressure $Pb$ acting on the piston 4. Because of this relationship, the exit path for the fuel oil returning from the servo piston chamber 3 is throttled by the piston 4 in the distributor-controller to control the back pressure $Pb$. Thus, it is possible to adjust the fuel injection quantity by adjusting the degree of this throttling.

Now, the distributor-controller will be described in reference to FIGS. 3 through 7, inclusive.

The fuel oil supplied at a constant pressure $Pp$ from the supply source, not shown, flows into a fuel-oil pipe connector 31, which is threadedly attached to the distributor body 30. From the connector 31, the oil enters an inlet hole 33 provided in a rotor sleeve 32. From this hole 33, the oil flows in the internal oil passages of a rotor 34 and ultimately reaches oil chamber 39 formed within rotor 34, said passages being an annular groove 35, cut out on the rotor periphery, a communicating hole 36 extending radially in rotor 34, an orifice 38 provided in a plug 37, which is secured oil-tightly to the rotor 34, and finally an orifice 41 provided in check valve 40. This check valve is located in said oil chamber 39 and its orifice 41 serves the purpose of keeping off the pressure waves reflecting back from the fuel injection valves. The oil chamber 39 is communicated to an outflow control port 42 provided in the rotor 34. As rotor 34 runs, its port 42 moves past so many communicating ports 43, provided in rotor sleeve 32, as there are fuel injection valves. Thus, when the port 42 meets one of the ports 43, the oil in the fuel chamber 39 flows through this port 43 and then the pipe connector 44, which is threadedly attached to body 30, and reaches the pipe connector 2 of the fuel injection valve. As rotor 34 rotates further from that position, its long channel 45, extending along the axis of the rotor on its outer surface, meets the same port 43 but, at this time, the port 42 is still and partially over the port 43, so that the constant pressure fuel oil in the oil chamber 39 flows through the control channel 45 and internal passage 46 to a check valve 47, and opens this check valve to enter an oil chamber 48 formed in the end portion of the rotor 34. From this chamber 48, the fuel oil is released to the atomospheric side through an oil channel 49 provided in the rotor 34, a throttling port 50 provided in the rotor sleeve 32, and then a pipe connector attached to the body 30. The pressure for opening the check valve 47 is such as will not actuate servo piston 4 in the injection valve. The pressure within the oil chamber 48 is adjusted, by the correlation between the amount of oil outflow, through the throttling port 50 and the amount of oil inflow through the check valve 47 opened, and remains in the pressure range below the pressure by which check valve 47 is opened. In other words, this pressure varies in proportion to variation of speed of the rotor 34. More will be mentioned later about the oil chamber 48. From the position of the rotor 34 mentioned above, the rotor 34 has turned a little further to bring the elongated return-oil control port 51, which is provided on the outer surface of the rotor 34 and extends axially, to and over the port 43 while shifting the outflow control channel 42 away from the port 43, thus closing this control channel. This positional change communicates the servopiston chamber 3 of the fuel injection valve to control port 51, so that the oil returning from this chamber because of the upward stroke of the piston 4 is led out to the atmospheric side through the path comprising: communicating the port 51; the port 52; the outflow port 53 in the rotor sleeve 32; the communicating passage 54 in the controller body 30; the governor chamber 55; the exit passage 57 and the throttle valve 58 inside the governor cover 56. The throttle valve 58 permits itself to be set by an external agent and serves the purpose of adjusting the rate of the return oil flow. Let Q stand for the per-second rate of outflow rate of return oil through the throttle valve 58, and $ql$ for the amount of return oil per stroke of the servo piston 4. Then the following equations are valid:

$$Q = C\, At\, \sqrt{\frac{2g}{\gamma} Pb} \qquad (1)$$

$$\frac{n}{60} gl - Q = Vl\, \frac{Pb}{E} \qquad (2)$$

where
$At$: set path area of outflow through the throttle valve 58,
$C$: outflow coefficient,
$\gamma$: specific gravity of fuel oil,
$n$: number of strokes of the plunger 5 in the injection valve, that is, revolution per minute (rpm) of the rotor 34,
$Vl$: total volume of fuel oil pressurized by the back pressure Pb of the servo piston chamber 3,
$E$: volumetric modulus of elasticity of fuel oil.

Figure 8:
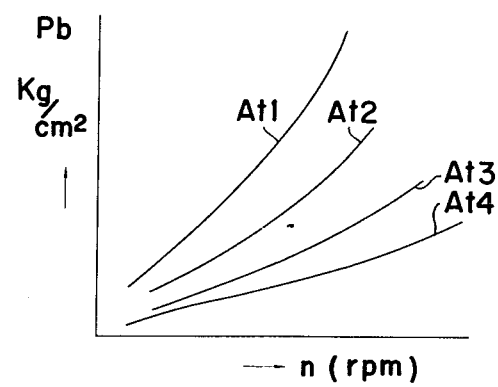

FIG. 8 graphically shows the relationship between $Pb$ and $n$ as determined by the equations (1) and (2) for $At$ taken as the parameter, of which $At1 > At2 > At3 > At4$.

Figure 9:
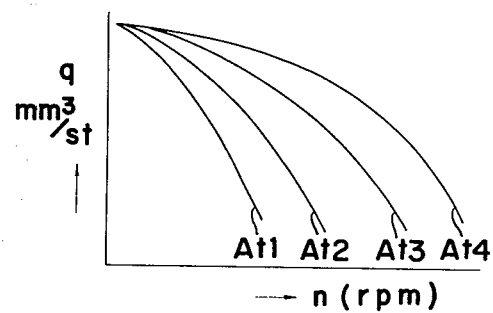

The injection quantity q for each plunger stroke can be equated as follows:

$$g = Ap\, S - \frac{Pi}{E} Vi \qquad (3)$$

where
$Ap$: cross sectional area of the plunger 6
$S$: stroke of the plunger 6 or the servo piston 4
$Pi$: fuel injection pressure
$Vi$: volume of fuel oil pressurized by the plunger Since S is inversely proportional to the back pressure $Pb$, the amount of oil displaced or the injection quantity $q$ too is inversely proportional to the back pressure $Pb$. Thus, from the equation (3) and FIG. 8, the relationship between the injection quantity $q$ and rpm $n$ takes such a form of characteristic curve as is shown in FIG. 9. This characteristic of the injection quantity is undesirable for direct-injection type engines. For that full-load injection quantity, in particular, a characteristic curve exhibiting a rising or, at least, level tendency at the right hand end is what is desirable; and some improvement for minimizing speed regulation at the highest speed is needed. It is for meeting these needs that a governor, directly coupled to the distribution mechanism, is provided. A governor chamber 55 is formed in one end of distributor-controller body 30 by enclosing the said end by a governor cover 56. A governor body 59 is secured to the end of the rotor 34 and contained in such a way as not to break the oiltightness of the chamber 48 but to be capable of running integrally with the rotor 34. A pair of centrifugal weights 60 and 61, disposed in apposition and in an abutting manner and urged by springs 62 and 63, respectively, toward the axis, are housed in the cylindrical bore provided in the governor body 59 to introduce a clearance 65 circumferentially by means of the V-shaped protrusion, formed of the weight 61, and by mating face 64 corresponding to the groove of the weight 60. Through the clearance 65, a communicating hole 66, provided on the periphery of or in the center of the weights 60 and 61, becomes communicated to the several longitudinal grooves 67. The oil passage thus introduced within the governor body 59 is so located that it becomes shut off when the centrifugal weight 60 rises on the lateral wall of the governor body 59, and is communicated to the control hole 68 leading into the governor chamber 55, and also to an annular groove 69 provided on the bore of the distributor body 30 to open into the communicating hole 54 in the wall of the body 30. Thus, this passage constitutes a part of the path of return oil to be ejected out through the throttle valve 58. Spring supports 70 and 71 for the springs 62 and 63 are in ring shape and serve as stoppers for the weights 60 and 61.

Figure 10:
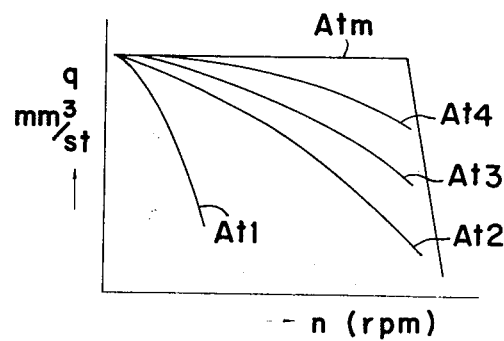

When the rotating speed of the rotor 34 reaches a predetermined speed level to enable the centrifugal force of the weight 61 to overcome the preload of the spring 63, the weight 61 starts shifting away, moving the V-shape mating face 64 from the weight 60, thereby enlarging the flow path area, next to the clearance 65, controlled by the weights 60 and 61. By this increased area, the area of oil releasing path within the governor increased in response to the increase in speed, under the given opening of the throttle valve 58, to result in a drop of back pressure $Pb$, an increase in plunger stroke S and, consequently, an increase in fuel injection quantity $q$. This corrective increase in injection quantity is produced mainly for the full-load injection quantity and can be accomplished by properly selecting such spring 63 as will maintain the back pressure $Pb$ constant to hold injection quantity q constant for the change in rpm $n$. When the rotor 34 reaches the maximum speed, the weight 61 will have already been bearing against the stopper, that is, the spring support 71, so that this weight is prevented from shifting. Then, as the weight 60 overcomes the preload of the spring 62, this weight moves for control action over the control hole 68 in the closing direction. Consequently, the back pressure $Pb$ rises and stroke S decreases, thereby causing injection quantity q to decrease rapidly. In other words, a governor action with a minimized speed regulation for the maximum speed is produced. The characteristic curve shown in FIG. 9 is thus improved to take the improved shape shown in FIG. 10. The line $Atm$ in the figure represents the full-load injection quantity characteristic and the maximum-speed control characteristic. With the springs 62 and 63 properly selected or by using different springs for acting on the centrifugal weights 60 and 61, the $Atm$ characteristic can be varied as desired in many ways.

In regard to the injection timing adjusting function of the device according to this invention, the function of the speed-responsive automatic injecting timing adjustment will be described first.

The end of distributor-controller body 30, opposite to the governor-side, is tightly enclosed by a cover 73 which supports a rotor drive shaft 72. The shaft 72 is connected, by its one end, to an engine-side drive shaft through a coupling 74 and by its other end to the rotor 34 through an oldham coupling in the body 30. Specifically, the end flange 75 of the shaft 72 has claws 76 protruding from its edge part. These claws are engaged with an intermediate plate 77 by fitting into the grooves provided in the plate. Similar claws 78, formed of the rotor 34, are engagedly fitted into the other grooves of the plate 77. The engagement is such that the plate 77 allows the rotor 34 to displace itself axially by an amount indicated as L. By the force of a timer spring 79 in compression, which is interposed between the drive shaft 72 and the plug 37 fitted into the rotor 34, the rotor 34 is kept pushed against the governor body 59. For the rotor 34 to be capable of moving in axial direction by the amount L, the governor body 59 must remain coupled to the rotor 34 while permitting the rotor 34 to separate from it axially without undoing the rotary engagement. This requirement is met by providing an engaging portion 59a on the governor body 59, as shown in FIG. 7, in such a way that the portion 59a will fit into the hole of rotor sleeve 32, and that claws 34a formed of the rotor 34 at its end face will mesh into the notched axial groove 59b of the governor body 59. The meshing parts are, of course, sized longer than L. The outflow control port 42 or at least that port of it which meets the communicating port 43 at the peripheral surface of the rotor 34 is a long groove slanting toward the axis of the rotor. The oil chamber 48 receives, as mentioned previously, the constant-pressure fuel oil through the control channel 45. Since there is a short duration of time in which both the channel 45 and the return-oil control port 51 concurrently meet the same communicating port 43, this chamber also receives the return oil with back pressure $Pb$. Thus, in order that the governor action mentioned above shall not be affected by the pressure variation occurring in the chamber 48, the check valve 47 therein is necessarily set to open at a pressure substantially higher than the governor control pressure.

With the foregoing arrangement, the injection timing is adjusted in the following manner:

As the rotating speed of the rotor 34 rises, the amount of oil, flowing through the control channel 45 and the oil passage 46 at the pressure $Pb$ or the back pressure $Pb$ and entering the oil chamber 48 by forcing the check valve 47 to open, increases. On the other hand, the flow path area of the throttling port 50 is constant, so that the pressure within the chamber 48 rises with a rising speed of rotation and reaches a level high enough to overcome the preload of the timing spring 79. When this happens, the rotor 34 shifts toward the left, in the figure, to change the angular position or phase angle at which the outflow control port 42 meets communicating the port 43. (This means that, for a rise in rotating speed, injection timing advances.) The advance characteristic so obtainable can be set as desired by properly selecting the timer spring 79. The stroke of the rotor 34 can be adjusted by means of a shim 80 located between the flange of the plug 37 and the intermediate plate 77.

Next, how the injection timing is adjusted in response to changes in load will be explained:

As was stated, the back pressure $Pb$, that is, the pressure of the oil returning the from servo piston 4 is inversely proportional to the injection quantity, that is, the engine load. This proportionality is made use of in this invention to automatically vary the injection timing according to the load. In actual practice, it is usually more often required to retard the timing for a specific intermediate load range, as is the case with this embodiment of this invention, than for the no-load or the full-load condition.

The return oil with the pressure Pb applies through an internal passage 81 and communicating passage 54, provided in the distributor body 30, to a piston valve 82, which is a pressure-responsive control valve built in the body 30. This valve is at right angles to the axis of the rotor 34, and has internal oil passages 84 and 97. At the rotating speed rises to increase the back pressure Pb to a level high enough to overcome the preload of a return spring 83, the piston valve 82 shifts and makes its oil passage 96, extending from its pressure face, meet an opening 94 of an oil passage 87 leading into a piston chamber 86 for a piston 85, thereby allowing the raised pressure Pb to apply to the piston 85. Consequently, the piston 85 moves forward against the counter-force offered by a return spring 88 and halts at a position where the two forces balance with each other. The stroke of the valve piston 85 is limited by a stopper 89. A radial hole 90 provided in the piston 85 carries a pin 91, which is connected to the piston 85 through a free joint 92. A pin 91 is engaged, on the other hand, with the rotor sleeve 32 in such a way that, when piston 85 shifts as mentioned above, the sleeve 32 becomes angularly displaced to alter its angular position or phase angle at which the outflow control port 42 meets the communicating port 43. (In the present instance, the sleeve 32 rotates in the direction for retarding the timing.)

When the rotating speed of the rotor 34 rises to and above a specific range, the return oil pressure Pb rises to shift the piston valve 82 further until a stopper 93 limits its movement, and this shift interrupts the communication between the passage 84 and the passage 87. Both peripheral grooves 95 and 96 are so arranged, it should be noted, that they lead into the internal passage 97 of the piston valve 82. Note also that the passage 97 opens out into the return spring chamber which is vented to the atmospheric side through a hole 98 provided in the side wall. Thus, in either case of speed change, the piston chamber 86 is communicated to the atmosphere, and the return spring 88 keeps the piston 85 pushed back all the way, so that no angular displacement of the sleeve 32 occurs and, therefore, no adjustment of the injection timing takes place. The advance characteristic produced in this manner by this mechanism is determined by the spring rate of the return spring 83 acting on the piston valve and also by the preload setting of this spring.

The foregoing description has been given in detail without thought of limitation since the inventive principles involved are capable of assuming other forms without departing from the spirit of this invention or the scope of the following claims.

What is claimed is:

1. A fuel injection device for internal combustion engines comprising, means for continuously feeding fuel under constant pressure, a distributor-controller comprising a rotor rotatable relatively to speed of the engine and a rotor sleeve with a first port in communication with the fuel feeding means and second ports in communication with fuel injection valves, the fluid fuel under pressure introduced through the first port being, under the influence of the turning rotor, distributed through the second ports to the fuel injection valves one after another and the fuel injection valves comprising a servo piston reciprocable under the fuel pressure and the force of a spring, a plunger having a diameter smaller than that of the servo piston and being movable according to the reciprocating movement of the servo piston and nozzle for injecting the fuel under increased pressure from the plunger, and switching, during the forward movement of the servo piston, from supplying and stopping of the supplying of fuel under pressure to discharging of the fuel returning from the servo piston during the backward movement of the same taking place in one fuel injection valve after another, is made possible through the switching action of the turning rotor to put one of a third port and a channel into and out of alignment with the second ports, when an outlet channel for the returning fuel becoming communicated with the atmospheric pressure through a throttling port, the servo piston during its backward movement being subjected to a back pressure variable according to a throttling of the throttling port to have a varied stroke thereby to control an amount of fuel to injected through the nozzle.

2. A device according to claim 1 in which the opening pressure of said nozzle is controlled by a needle valve and arranged to rest on a seat under the influence of fluid pressure, and wherein there is further provided a piston valve reciprocable through a range variable according to a balance between the force of a spring and fluid pressure to act on the piston valve through the throttling port, said fluid pressure at the same time acting on the servo piston, and a passage for feeding fluid pressure to close the needle valve, the servo piston being reciprocable according to changes in fluid pressure acting thereon thereby to control the channel extending from the throttling port to the nozzle synchronously to the reciprocating movement thereof and thus to maintain constant the opening pressure of the nozzle.

3. A device according to claim 1 in which the distibutor-controller comprises centrifugal weights rotatable together with the rotor and axially displaceable within a cylinder bore to a position according to balance between the centrifugal force and the forces of springs, to said forces they being subjected, the cylinder bore constituting part of a discharge channel extending from the second ports of the rotor sleeve to a throttling port and the channel being controlled in the closing direction by the weights as the weights slides through the cylinder bore against the forces of the springs when the rotor rotates faster than a predetermined speed thereby to control an amount of fluid fuel to be injected relatively to the rotational speed of the rotor.

4. A device according to claim 1 in which the distributor-controller comprises a pair of centrifugal weights which are disposed in the cylinder bore oppositely to each other, the weights being rotatable together with the rotor and being axially displaceable under the forces of the springs to a position determined dependantly on balance between the centrifugal force and the forces of the springs, the cylinder bore forming part of the channel extending from the second ports to the throttling port, the centrifugal weights, when the rotor comes to rotate faster than a speed predetermined with respect to each weight, sliding through the cylinder bore against the forces of the springs thereby to control the cross sectional area of this part of the channel above mentioned, and when one of the centrifugal weights progressively increasing the cross sectional area of the discharge channel until it reaches a completely open state as the rotational speed of the rotor increases, the other weight controlling the discharge channel in the closing direction thus to control an amount of fluid fuel to be injected relatively to the rotational speed of the rotor.

5. A device according to claim 1 in which the distributor-controller comprises a chamber adjacent to one end face of the rotor, a channel with a throttling port through which the chamber makes an intermittent communication with the atmospheric pressure during the rotation of the rotor, a channel with a control channel and a non-return valve between the control channel and the chamber, the control channel being provided on the periphery of the rotor and arranged to come into continuous communication with the second ports during the rotation of the rotor, a timer spring acting against the fluid pressure prevailing in the chamber and determining an axial position of the rotor when it comes into balance with the fluid pressure, and an elongated slot on the periphery of and inclined with respect to the axial of the rotor, and when, during the rotation of the rotor, the fluid fuel under pressure which has been introduced through the second ports passes the chamber through the control channel, the nonreturn valve and the throttling port, the fluid pressure in the chamber being changed relatively to the rotational speed of the rotor, resulting in an axial displacement of the rotor and a relative change in the rotational phase of the rotor in which the third port becomes communicated with the second ports, thereby to control the timing of fuel injection.

6. A device according to claim 1 in which the distributor-controller comprises a pressure-responsive piston axially displaceable according balance between a back pressure of the servo piston of the fuel injection valve and the force of a spring acting against the back pressure, a channel for connecting the control port for fuel returning from the servo piston to the pressure-responsive piston, a pressure-responsive valve arranged intermediate of the above channel for switching the channel in response to variations in the back pressure, that is, actuating the pressure-responsive piston by feeding a back pressure fluid fuel to the same when the back pressure remains within a predetermined range, and on the other hand, to put the piston inactive by making the same communicated with the atmospheric pressure when the back pressure rises beyond the limits, and a universal joint for joining the rotor sleeve and the piston in such manner that the rotor sleeve may rotate following the reciprocating movement of the piston, and, when the piston makes a displacement due to a back pressure within predetermined limits, the rotor sleeve being rotated to change the relative rotational phase of the second ports with respect to the port thereby to control an amount of fuel to be injected.

* * * * *